(12) United States Patent
Morel et al.

(10) Patent No.: US 9,611,865 B2
(45) Date of Patent: Apr. 4, 2017

(54) BYPASS TURBOJET

(75) Inventors: Cedric Morel, Paris (FR); Alexandre Alfred Gaston Vuillemin, Fontainebleau (FR)

(73) Assignee: SNECMA, Paris (FR)

( * ) Notice: Subject to any disclaimer, the term of this patent is extended or adjusted under 35 U.S.C. 154(b) by 717 days.

(21) Appl. No.: 13/978,047

(22) PCT Filed: Jan. 5, 2012

(86) PCT No.: PCT/FR2012/050027
§ 371 (c)(1),
(2), (4) Date: Jul. 2, 2013

(87) PCT Pub. No.: WO2012/095592
PCT Pub. Date: Jul. 19, 2012

(65) Prior Publication Data
US 2013/0280046 A1    Oct. 24, 2013

(30) Foreign Application Priority Data

Jan. 11, 2011   (FR) ...................... 11 50224

(51) Int. Cl.
*F04D 29/66* (2006.01)
*F02C 6/08* (2006.01)
(Continued)

(52) U.S. Cl.
CPC ............. *F04D 29/663* (2013.01); *F02C 6/08* (2013.01); *F02C 7/045* (2013.01); *F02K 3/06* (2013.01);
(Continued)

(58) Field of Classification Search
CPC .... F04D 29/663; F04D 29/681; F04D 29/682; F04D 29/526; F05D 2220/36; F05D 2270/17
See application file for complete search history.

(56) References Cited

U.S. PATENT DOCUMENTS

| 3,730,639 A | 5/1973 | Moore et al. | |
| 3,735,593 A * | 5/1973 | Howell | F02C 7/045 |
| | | | 181/222 |

(Continued)

FOREIGN PATENT DOCUMENTS

GB     2 407 142     4/2005

OTHER PUBLICATIONS

International Search Report Issued Mar. 12, 2012 in PCT/FR12/50027 Filed Jan. 5, 2012.

*Primary Examiner* — Gregory Anderson
*Assistant Examiner* — Michael Sehn
(74) *Attorney, Agent, or Firm* — Oblon, McClelland, Maier & Neustadt, L.L.P.

(57) ABSTRACT

A bypass turbojet including a fan wheel carrying blades and surrounded by an annular casing, the casing including an air suction mechanism sucking air from an annular clearance formed between the casing and radially outer ends of the blades of the fan wheel. The air suction mechanism includes an inlet including at least one inlet slot formed in an inside wall of the casing and connected to a suction channel extending downstream. The inlet slot of the suction mechanism is situated axially in register solely with upstream portions of chords of the blades of the fan wheel at their radially outer ends.

8 Claims, 2 Drawing Sheets

(51) Int. Cl.
    *F02C 7/045*        (2006.01)
    *F02K 3/06*         (2006.01)
    *F04D 29/52*        (2006.01)
    *F04D 29/68*        (2006.01)
(52) U.S. Cl.
    CPC ......... *F04D 29/526* (2013.01); *F04D 29/682* (2013.01); *Y02T 50/672* (2013.01)

(56) References Cited

U.S. PATENT DOCUMENTS

| | | | | |
|---|---|---|---|---|
| 4,901,520 | A * | 2/1990 | Kozak | F02C 6/08 |
| | | | | 415/115 |
| 6,004,095 | A | 12/1999 | Waitz et al. | |
| 6,574,965 | B1 * | 6/2003 | Feulner | F01D 11/10 |
| | | | | 415/168.2 |
| 7,200,999 | B2 * | 4/2007 | Bagnall | B64C 21/06 |
| | | | | 60/226.1 |
| 7,549,838 | B2 * | 6/2009 | Touyeras | F04D 27/023 |
| | | | | 415/144 |
| 2005/0081530 | A1 | 4/2005 | Bagnall et al. | |
| 2009/0196739 | A1 * | 8/2009 | Tsuchiya | F02C 7/04 |
| | | | | 415/119 |

* cited by examiner

BYPASS TURBOJET

BACKGROUND OF THE INVENTION

Field of the Invention

The present invention relates to a bypass turbojet for an aircraft, in particular an airplane.

Description of the Related Art

Reducing sound emission from airplanes in the vicinity of airports is a major challenge, and ever stricter standards are being imposed on this topic.

Investigation efforts have identified and quantified the main phenomena responsible for the high noise levels generated by airplanes during landing and takeoff. Roughly speaking, noise can be separated into two major categories, namely airframe noise and engine noise.

Airframe noise is due to interactions between the flow of air and obstacles or irregularities on the surface of the airplane, such as landing gear, leading edge slats, trailing edge flaps, etc.

With a bypass turbojet, engine noise mainly comprises jet noise due to rapid ejection of hot gas by the nozzle, and fan noise due to interactions between the flow of air and the stationary structure, which interactions are generated by the fan airfoils driving the secondary or "bypass" stream.

It should be recalled that a bypass turbojet has a fan wheel carrying blades and rotating within an annular casing. Downstream from the fan, a portion of the air stream is directed to a primary or "core" passage in which a primary stream flows that is compressed by a low-pressure compressor and by a high-pressure compressor in order to feed a combustion chamber, with another portion of the air stream from the fan being directed into a bypass passage into which there extends a set of outlet guide vanes (OGVs).

The sound spectrum from a fan may be subdivided into a tonal portion and a wide band portion of magnitude that has increased with the appearance of turbojets having a very large bypass ratio, i.e. in which the bypass stream is large.

There are many wide band noise sources in a fan, with a dominant source being the interaction between the wake from the fan wheel and the stator, and in particular the OGVs.

In order to minimize the noise generated by the fan, one solution consists in optimizing the design of the guide vanes. Nevertheless, constraints on the efficiency of the engine at cruising speed do not enable the vanes to be best adapted for operation during approach or takeoff.

U.S. Pat. No. 3,730,639 proposes fitting the outer casing of the fan with suction means including an air inlet opening implemented by a slot located upstream from the radially outer ends of the blades of the fan wheel, together with a suction pump.

In this way, a portion of the boundary layer formed on the inside wall of the outer casing is sucked in so as to limit interactions between the boundary layer and the blades of the fan wheel, thereby reducing noise. That solution does not significantly reduce the dominant component of the noise, which is generated by the interaction between the wake of the fan wheel and the OGVs situated downstream therefrom.

Furthermore, the presence of clearance between the casing and the ends of the blades of the fan wheel leads to turbulence being generated by an effect of the flow at the tips being entrained, which turbulence carries a high level of turbulent kinetic energy that, once mixed with the boundary layer on the casing, contributes significantly to the wide band noise of the interaction between the turbulent wake and the OGVs.

A known solution consists in providing means for injecting air into the turbulent zones of the fan. To do that, air-passing channels need to be made in the blades of the fan wheel, thereby making such blades more complicated to manufacture, in particular when they are made out of composite material.

BRIEF SUMMARY OF THE INVENTION

A particular object of the invention is to provide a solution to this problem that is simple, effective, and inexpensive.

To this end, the invention provides a bypass turbojet having a fan wheel carrying blades and surrounded by an annular casing, the turbojet being characterized in that the casing includes air suction means for sucking air from the annular clearance formed between the casing and the radially outer ends of the blades of the fan wheel.

The suction means as positioned in this way serve to suck out the turbulent flow at the tips of the blades of the fan wheel so that it does not interact with the OGVs located downstream, thereby significantly reducing the noise generated by interaction between the wake of the fan wheel and the stator, in particular the OGVs situated downstream.

According to a characteristic of the invention, the suction means comprise an inlet formed by at least one inlet slot made in the inside wall of the casing and connected to a suction channel extending downstream.

Advantageously, the inlet slot of the suction means is situated axially in register solely with the upstream portions of the chords of the blades of the fan wheel at their radially outer ends.

Positioning the suction slot solely in register with the upstream portions of the chords enables the flow to be sucked out from the clearance as soon as turbulence appears at the corners of the leading edges. Simulations have shown that there are several locations where turbulence begins at the tips of the blades, with the more energetic locations lying approximately over the first third of the chord at the tip of a blade. The slots are thus positioned in the zone where the largest amount of turbulent activity is created.

Thus, the entry slot of the suction means is preferably situated axially in register solely with the upstream thirds of the cords of the blades of the fan wheel at their radially outer ends.

Preferably, the inlet slot has an axial dimension lying in the range 3% to 10% of the chord of the blades at their radially outer ends.

Thus, only a small fraction of the air flow is taken, so as to avoid penalizing the efficiency of the engine.

According to another characteristic of the invention, the inlet slot is annular or made up of a plurality of orifices distributed around the axis of the fan.

The suction means may comprise a suction pump housed in the casing.

In an embodiment of the invention, the suction means comprise at least two inlet slots formed in the inside wall of the casing and axially offset relative to each other.

Advantageously, the air suction means comprise an annular manifold housed in the casing and connected to the inlet slot(s) via suction channels.

The air suction means may also comprise air outlet orifices formed downstream from the fan wheel in the outside wall or in the inside wall of the fan casing.

More particularly, the outlet orifices of the air suction means may be formed in the inside wall of the fan casing, downstream from the outlet OGVs of the fan.

BRIEF DESCRIPTION OF THE SEVERAL VIEWS OF THE DRAWINGS

The invention can be better understood and other details, characteristics, and advantages of the invention appear on reading the following description made by way of nonlimiting example and with reference to the accompanying drawings, in which.

DETAILED DESCRIPTION OF THE INVENTION

Figure 1:
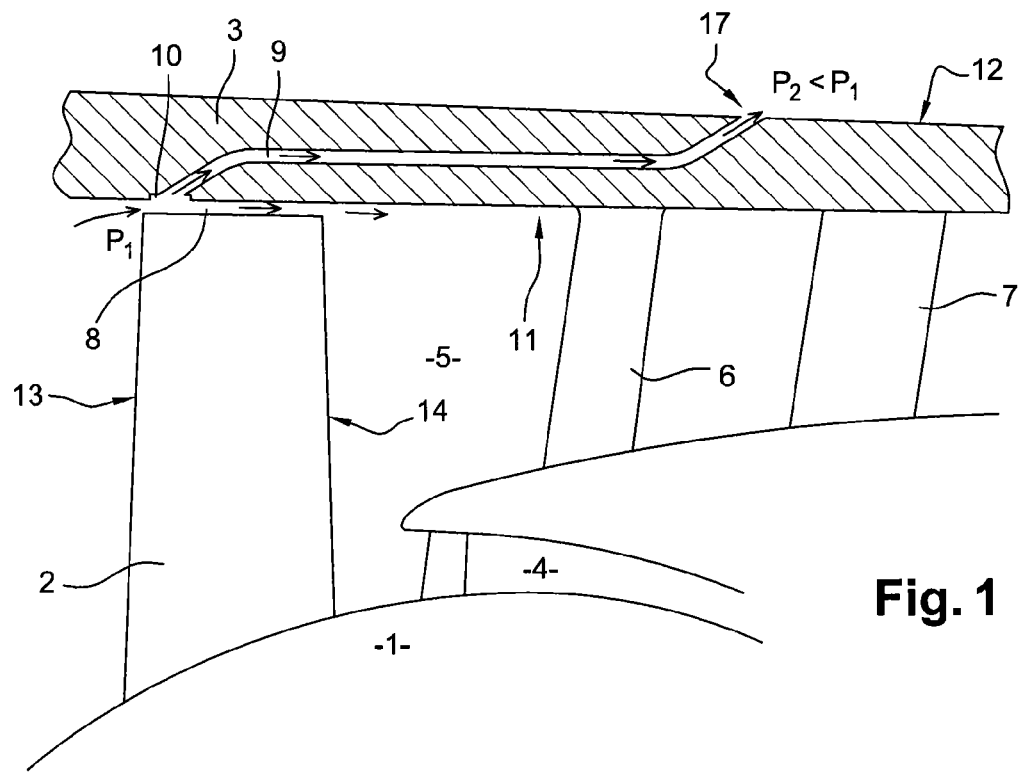
FIG. 1 is a diagram in section view of a portion of a turbojet in a first embodiment of the invention.

FIG. 1 shows a portion of a turbojet having a fan wheel 1 carrying blades 2 and surrounded by an annular casing 3. Downstream from the fan, a portion of the stream it produces is directed to a core or primary passage 4 in which there flows a primary stream that is to be compressed by a low-pressure compressor and by a high-pressure compressor in order to feed the combustion chamber (not shown), and another portion of the stream from the fan is directed towards a bypass or secondary passage 5 into which there extends a set of OGVs 6. The effect of the guide vanes 6 is to straighten out the flow of secondary air that leaves the fan in order to limit its gyration.

Downstream from the OGVs 6 there are radial structural arms 7 presenting great mechanical strength and also extending through the secondary passage 5.

In the invention, the casing 3 includes air suction means opening out into the annular clearance 8 formed between the casing 3 and the radially outer ends of the blades 2 of the fan wheel 1.

In the embodiment shown in FIG. 1, the air suction means comprise at least one suction channel 9 having a mouth opening out into the above-mentioned annular clearance 8 and formed by an inlet slot 10 made in the inside wall 11 of the casing 3. The slot 10 extends over the entire circumference of the inside wall of the casing 3, and each suction channel 9 extends downstream to open out on the outside wall 12 of the casing in a determined zone, e.g. a zone situated axially downstream from the set of OGVs 6 in order to blow the air outwards so as to reattach the boundary layer onto the outside wall 12 of the casing, should that be necessary.

The dimensions and the position of the slots 10 and of the suction channels 9 are determined so that only a small fraction of the air flow passing through the fan is taken by the slot 10, for example 0.5% to 2% of the total flow rate, and preferably about 1%.

The flow rate of air that is sucked out is substantially proportional to the speed of rotation of the shaft of the low-pressure turbine that drives the fan wheel 1, and its speed varies considerably between the stages of landing and takeoff. The flow rate of air that is sucked out depends on the radial clearance 8 between the outer ends of the blades 2 and the inside wall 11 of the casing 3.

The inlet slot 10 has an axial dimension lying in the range 3% to 10% of the chords of the blades 2 at their radially outer ends. It should be recalled that the chord of a blade is the distance between its leading edge 13, i.e. its upstream edge, and its trailing edge 14, i.e. its downstream edge.

The inlet slot 10 of the suction means is situated axially facing only the upstream halves of the chords of the blades 2 at their radially outer ends. The inlet slot 10 therefore does not extend upstream from the ends of the blades, nor does it face the downstream halves of the chords of the blades 2.

Instead of an annular inlet slot 10, it is possible to provide a series of orifices that are circumferentially distributed around the axis of the fan.

In the example of FIG. 1, the pressure $p_2$ at the outlet from each suction channel 9 is less than the pressure $p_1$ at the inlet to the slot 10, with the pressure difference serving to overcome head losses in the channel 9 and to suck in air. There is therefore no need to fit the channel(s) 9 with a suction pump.

Figure 2:
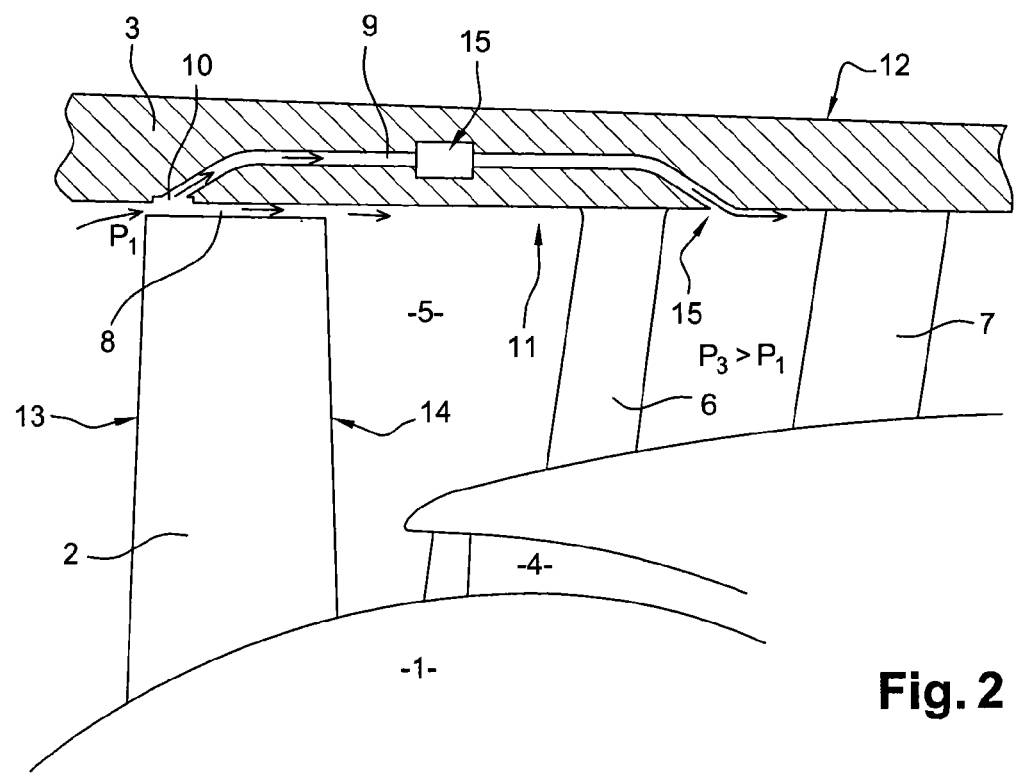
FIG. 2 is a view corresponding to FIG. 1 showing a second embodiment of the invention.

On the contrary, in the embodiment of FIG. 2, the suction channel 9 opens out into the inside wall 11 of the casing 3 downstream from the OGVs 6 in a zone where the pressure $p_3$ is greater than in the inlet slot 10. It is therefore necessary to fit the suction channel with a suction pump 15 that is housed in the casing 3.

Naturally, the number and the positions of the channels 9 may vary as a function of the application.

Figure 3:
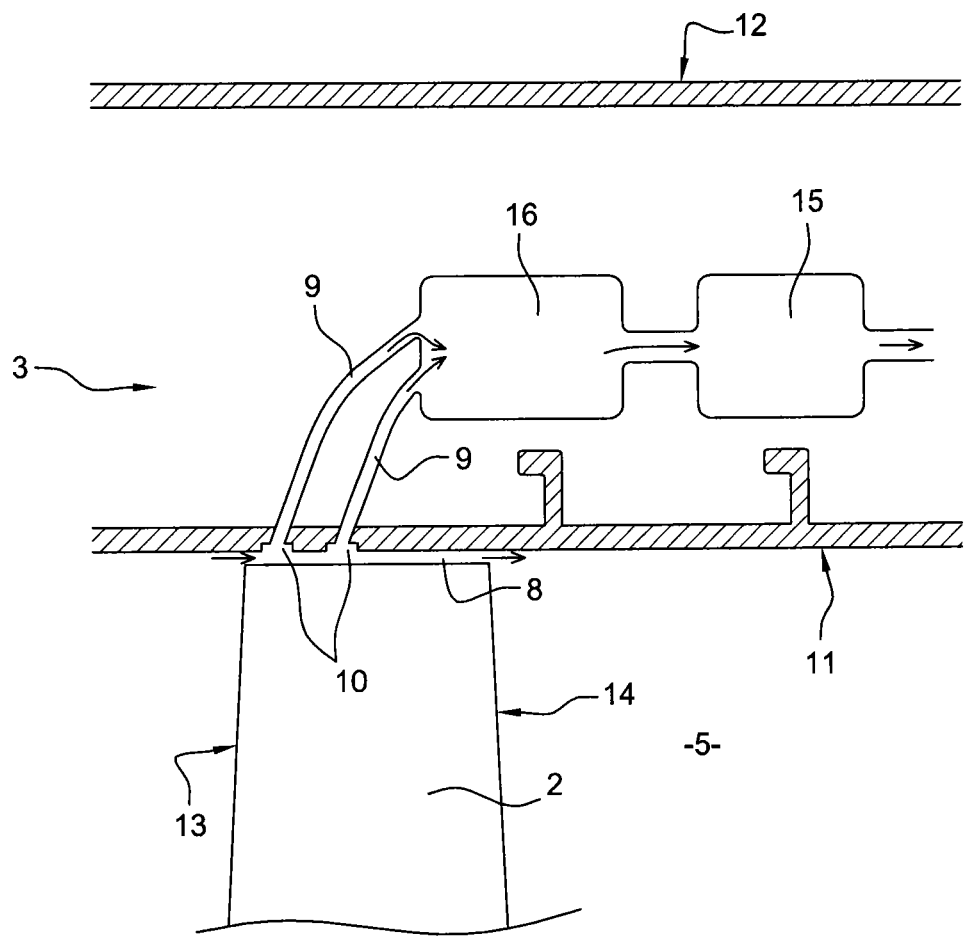
FIG. 3 is a view in section and on a larger scale showing a portion of a turbojet in a third embodiment of the invention.

In the embodiment of FIG. 3, the outer casing 3 has at least two inlet slots 10 formed in the inside wall 11 of the casing 3 and offset axially relative to each other. Suction channels 9 extend downstream from each of the inlet slots 10 to an annular manifold 16 housed in the casing 3. The air in the manifold 16 is then sucked out by means of a pump 15 and is then ejected either through the inside wall 11 of the casing 3 or through the outside wall 12, in a manner similar to that described above.

Regardless of the embodiment used, the invention thus makes it possible to take air from the flow at the tips of the fan blades 2 in order to limit the interaction between this highly turbulent flow and the OGVs 6 situated downstream. This makes it possible to obtain a significant reduction in the wide band noise that is generated by this interaction. Since the fraction of the fan flow rate that is taken off is small, the efficiency of the fan is not significantly penalized.

The invention claimed is:

1. A bypass turbojet comprising:
a fan wheel carrying blades and surrounded by an annular casing,
the casing including air suction means for sucking air from an annular clearance formed between the casing and radially outer ends of the blades of the fan wheel,
the suction means comprising an inlet including at least one inlet slot formed in an inside wall of the casing and connected to a suction channel extending downstream,
wherein the blades of the fan wheel are upstream of a primary passage for a primary stream in which a low-pressure compressor and a high-pressure compressor are disposed, and a secondary passage for a secondary stream in which outlet guide vanes are disposed,
wherein the inlet slot of the suction means is situated axially in register only with upstream portions of chords of the blades of the fan wheel at radially outer ends thereof so as to face the radially outer ends of the upstream portions of the chords of the blades of the fan wheel in a radial direction,
wherein an outlet of the suction channel is provided in the annular casing axially downstream of the outlet guide vanes, and
wherein the suction means comprises a suction pump housed in the casing.

2. A turbojet according to claim 1, wherein the inlet slot has an axial dimension in a range of 3% to 10% of the chord of the blades at the radially outer ends thereof.

3. A turbojet according to claim 1, wherein the inlet slot is annular or includes a plurality of orifices distributed around an axis of the fan.

4. A turbojet according to claim 1, wherein the suction means comprises at least two inlet slots formed in the inside wall of the casing and axially offset relative to each other.

5. A turbojet according to claim 1, wherein the air suction means comprises an annular manifold housed in the casing and connected to the inlet slot via suction channels.

6. A turbojet according to claim 1, wherein the outlet of the suction channel is provided in an outside wall or in the inside wall of the casing.

7. A turbojet according to claim 6, wherein the outlet of the suction channel is provided in the inside wall of the casing.

8. A turbojet according to claim 1, wherein 0.5% to 2% of a total air flow passing through the fan wheel is taken by the at least one inlet slot.

\* \* \* \* \*